United States Patent
Gates et al.

(10) Patent No.: US 10,514,766 B2
(45) Date of Patent: Dec. 24, 2019

(54) SYSTEMS AND METHODS FOR DETERMINING EMOTIONS BASED ON USER GESTURES

(71) Applicant: DELL PRODUCTS L.P., Round Rock, TX (US)

(72) Inventors: Carrie Elaine Gates, Livermore, CA (US); Gabriel Mauricio Silberman, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 723 days.

(21) Appl. No.: 14/735,060

(22) Filed: Jun. 9, 2015

(65) Prior Publication Data
US 2016/0364002 A1  Dec. 15, 2016

(51) Int. Cl.
  *G06F 3/01*  (2006.01)
  *G06N 20/00*  (2019.01)

(52) U.S. Cl.
  CPC ........ *G06F 3/017* (2013.01); *G06F 2203/011* (2013.01); *G06N 20/00* (2019.01)

(58) Field of Classification Search
  CPC .. G06F 3/017; G06F 2203/011; G06N 99/005
  See application file for complete search history.

(56) References Cited

U.S. PATENT DOCUMENTS

| | | | |
|---|---|---|---|
| 5,720,619 A * | 2/1998 | Fisslinger | A63F 13/10 434/336 |
| 8,621,416 B1 | 12/2013 | Thomas | |
| 2002/0131331 A1 * | 9/2002 | Molander | G04G 21/00 368/82 |
| 2003/0217123 A1 * | 11/2003 | Anderson | G06F 1/26 709/219 |
| 2008/0195980 A1 | 8/2008 | Morris | |
| 2009/0002178 A1 | 1/2009 | Guday et al. | |
| 2009/0240647 A1 | 9/2009 | Green et al. | |
| 2012/0011477 A1 * | 1/2012 | Sivadas | G06F 3/015 715/866 |
| 2013/0157719 A1 * | 6/2013 | Liu | G06F 3/017 455/556.1 |

(Continued)

OTHER PUBLICATIONS

Brownlee, "A Tour of Machine Learning Algorithms," Nov. 25, 2013, https://machinelearningmastery.com/a-tour-of-machine-learning-algorithms/.*

(Continued)

*Primary Examiner* — Ryan Barrett
(74) *Attorney, Agent, or Firm* — North Weber & Baugh LLP (57) ABSTRACT

Various embodiments of the invention allow to detect and analyze gestures, such as tapping and swiping patterns, that a user performs in the process of interacting with a computing device to determine the user's mood therefrom, so as to initiate an appropriate response. In certain embodiments, this is accomplished, without requiring labeled training data, by monitoring a user-device interaction via sensors and analyzing the sensor data based on contextual data via a processor to determine a gesture and one or more properties associated with an emotional state of the user. A response is generated based on the identified emotional state.

20 Claims, 5 Drawing Sheets

(56) References Cited

U.S. PATENT DOCUMENTS

| | | | |
|---|---|---|---|
| 2013/0216126 A1* | 8/2013 | Chen | G06K 9/62 |
| | | | 382/156 |
| 2014/0085181 A1 | 3/2014 | Roseway et al. | |
| 2014/0104197 A1 | 4/2014 | Khosravy et al. | |
| 2014/0107531 A1 | 4/2014 | Baldwin | |
| 2014/0143064 A1 | 5/2014 | Tran | |
| 2014/0179270 A1 | 6/2014 | Anand | |
| 2014/0191939 A1 | 7/2014 | Penn et al. | |
| 2014/0278455 A1* | 9/2014 | Chandrasekaran | |
| | | | G06Q 30/0203 |
| | | | 705/2 |
| 2014/0337093 A1 | 11/2014 | Jain | |
| 2015/0015509 A1* | 1/2015 | Shanabrook | G06F 3/011 |
| | | | 345/173 |
| 2016/0070440 A1* | 3/2016 | Williams | G06F 3/04842 |
| | | | 715/745 |
| 2016/0085802 A1* | 3/2016 | Rios, III | G06F 16/245 |
| | | | 705/14.66 |
| 2017/0308909 A1* | 10/2017 | Faith | G06Q 30/0201 |
| 2018/0024626 A1* | 1/2018 | Sanger | G06F 16/5866 |
| | | | 463/13 |
| 2018/0144746 A1* | 5/2018 | Mishra | G10L 25/51 |

OTHER PUBLICATIONS

Castellano et al., "Recognising Human Emotions from Body Movement and Gesture Dynamics," ACII 2007, LNCS 4738, pp. 71-82, 2007.*

Coutrix et al., "Identifying Emotions Expressed by Mobile Users through 2D Surface and 3D Motion Gestures," UbiComp 2012.*

Joung et al., "Tactile Hand Gesture Recognition through Haptic Feedback for Affective Online Communication," HCI International 2011, vol. 6, LNCS 6766.*

Silver et al., "Inductive Transfer with Context-Sensitive Neural Networks," Oct. 21, 2008, Mach Learn (2008) 73: 313-336, DOI 10.1007/s10994-008-5088-0, https://link.springer.com/content/pdf/10.1007/s10994-008-5088-0.pdf.*

LiKamWa, "MoodScope: Building a Mood Sensor from Smartphone Usage Patterns," MobiSys '13 Proceeding of the 11th annual international conference on Mobile systems, applications, and services, pp. 465-466 , Jun. 25-28, 2013, https://dl.acm.org/citation.cfm?id=2483967.*

Likamwa, Robert et al., "Moodscope: Building a Mood Sensor from Smartphone Usage Patterns," MobiSys '13, Jun. 25-28, 2013, Taipei, Taiwan, Copyright 2013 ACM 978-1-4503-1672-Sep. 13, 2006 . . .$15.00 (13pgs).

Printed from the Internet:URL:http://www.sightcorp.com, 2015 (4pgs).

Printed from the Internet: URL: http://www.nviso.ch, "3D Facial Imaging Software and Emotion Analytics Cloud Service/nViso," 2011 (2pgs).

Printed from the internet: URL: http://www.emotient.com, "Emotions Predict Attitudes and Actions," 2015 (3pgs).

Printed from the internet: URL: http://www.noldus.com, "Innovation solutions for behavioral research," 2015 (6pgs).

Printed from the internet: URL: http://www.affectiva.com (6pgs).

Bhavna Singh, "Dell is Developing a Technology that can Sense User Emotions," printed from the internet:URL: http://www.iamwire.com/2014/12/dells-developing-technology-sense-user-emotions/105755, Dec. 5, 2014 (4pgs).

* cited by examiner

SYSTEMS AND METHODS FOR DETERMINING EMOTIONS BASED ON USER GESTURES

BACKGROUND

A. Technical Field

The present invention relates to computer systems and, more particularly, to systems, devices, and methods of detecting emotions via gestures by users of computing systems.

B. Background of the Invention

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some existing information handling systems are capable of performing various types of facial and voice analyses to aid in the detection of a user's emotional condition. Such mood analysis can be used to gain information about the impact of a product on a user of that product, for example, to determine user satisfaction. Other information handling systems apply mood analysis to a piece of software (e.g., gaming or educational software) in an attempt to detect user perception. Mood analysis may be used to detect whether a user perceived the software as performing too slowly. From this it may be inferred that the user is bored, frustrated, etc.

User gestures have been studied in academic research in the area of authentication (e.g., to distinguish users from each other) but gestures have not been used to estimate emotional conditions of a user, mainly because the use of applications on mobile devices does not lend itself to existing approaches for mood analysis.

What is needed are systems and methods that overcome the above-mentioned limitations and allow for the detection of the emotional state of a user interacting with a computing system, such that appropriate action can be initiated to achieve a desired outcome.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that this is not intended to limit the scope of the invention to these particular embodiments.

DETAILED DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

Furthermore, it shall be noted that: (1) certain steps may optionally be performed; (2) steps may not be limited to the specific order set forth herein; (3) certain steps may be performed in different orders; and (4) certain steps may be done concurrently.

In this document, the term "gesture" includes any interaction between a user and a computing device, such as swiping a finger, a facial expression, a pressure, a speed, a location, a time, a device orientation, and an intensity of an action or reaction, whether provided voluntarily or involuntarily.

Figure 1:
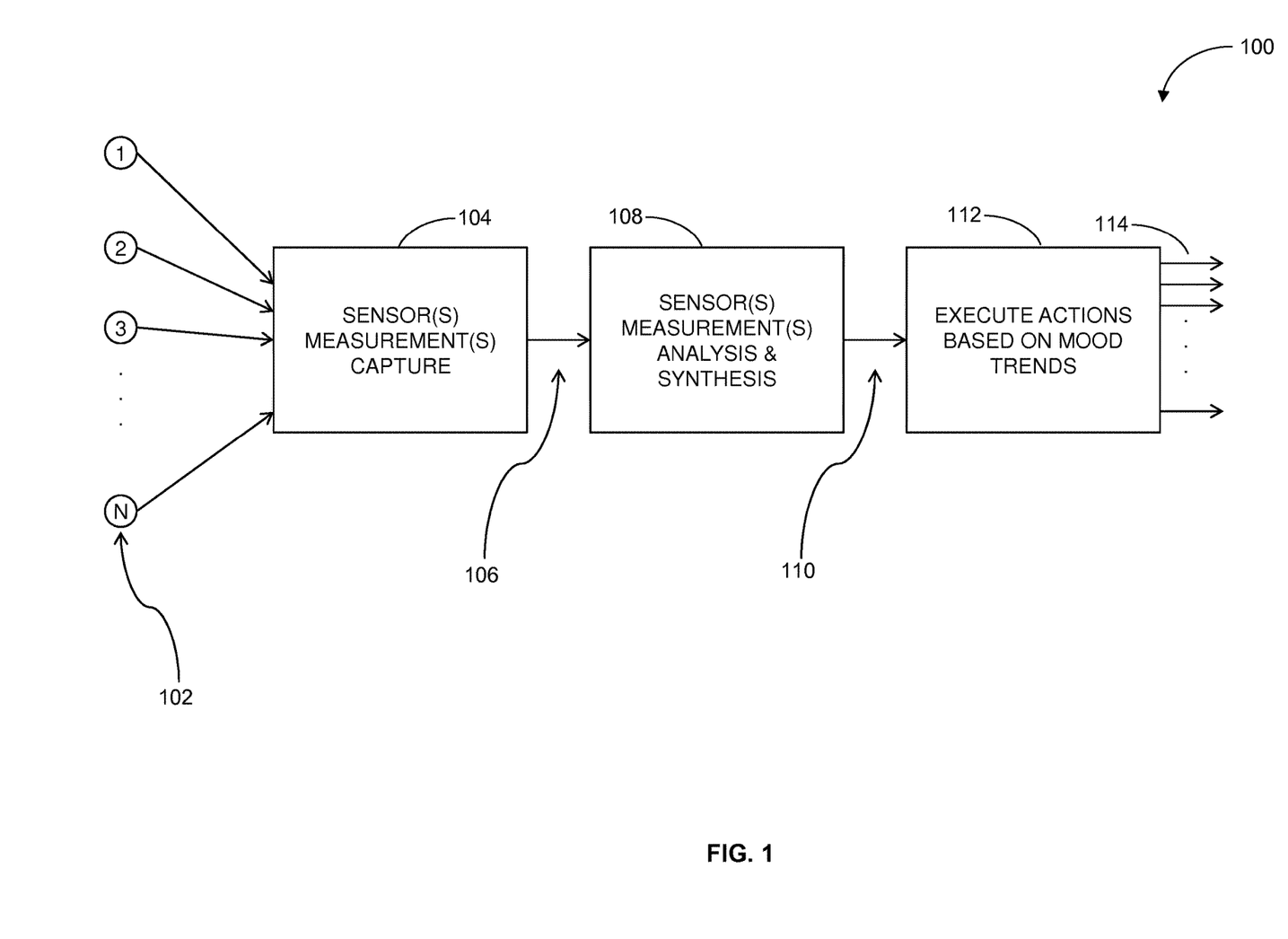
FIG. 1 is an illustrative system for determining the emotional state of a user.

FIG. 1 is an illustrative system for determining the emotional state of a user. System 100 comprises one or more sensors 102, data processor 104, analysis module 108, and response module 112. Sensor 102 may be implemented in a pointing device, a keyboard, a touchscreen, or any other device that is coupled to or is part of a computing system. Sensor 102 is any sensor capable of detecting a gesture by users of the computing system. In embodiments, one or more sensors 102 are configured to detect environmental variables, such as room temperature, illumination, and the like.

In embodiments, sensor 102 comprises an accelerometer to determine a position of the device or a relative speed of the device. Sensor 102 outputs a sensor signal, for example, as a differential analog signal that serves as input into data processor 104. Data processor 104 is any device capable of receiving and converting sensor data (e.g. an analog-to-digital converter). Analysis module 108 is coupled or integrated with data processor 104 to receive and process raw or pre-processed sensor data 106 and output processed data 110 to response generator 112. Response generator 112 generates one or more output signals 114 based on processed data 110. Output signals 114 may be provided to actuators and other external systems, including software applications.

In operation, sensor 102 detects one or more gesture information, including any change in intensity, speed, or acceleration of a gesture. In embodiments, the gesture is related to a body language or the physical condition of a user that is captured by sensor 102. As used herein, the term "gesture" comprises any combination of a swiping pattern across a touch display; pressure exerted on a touch display or any other part of an electronic device (e.g., finger pressure as measured by relative finger size generated on a touch screen during the course of a swipe); a swiping speed; a spatial or temporal start or stop location; a verbal or facial expression; a movement of the device; and any other verbal and non-verbal communication, whether voluntarily or involuntarily performed by a user or a device associated with the user.

In embodiments, detection may also comprise detecting a physiological condition, e.g., measuring the breathing rate of a user. The output signal of sensor 102 may be raw or pre-processed sensor data that may be input to data processor 104.

In embodiments, data processor 104 converts a format of the sensor signal (e.g., analog sensor data) into a suitable format that can be understood by an analysis module 108 (e.g., digital data). Analysis module 108 analyzes sensor data 106 to determine a gesture that allows an inference to be made about an emotional state of a user, including any change or trend. The gesture may be a result of an interaction between the user and a mobile device on which the user performs actions involving a touch display. Actions include tapping on the display to open a software application, swiping across the display to move between screens, and scrolling through screens. When the user is angry or frustrated, and the interactions with the device are performed different from a "normal" or reference mode, a difference may be detected in the form of a variation in gesture patterns, speed, etc. For example, it may be detected that in some instances the user taps the screen more violently or performs swiping motions more rapidly in comparison to a reference behavior in the normal mode. In embodiments, sensor data 106 includes derivative data, such as the time elapsed between two or more taps or the relative length of a swipe action on a screen.

In embodiments, analysis module 108 compares sensor data 106 to user-specific reference sensor data in order to detect whether a difference exceeds a certain threshold, thereby, indicating a change in an emotional state of the user who caused the difference in sensor data 106 by acting sufficiently different or by interacting sufficiently different with the device to cause sensor 102 to sense the discrepancy. For example, an angry user will handle a phone differently by holding the phone more rigidly, thus, exerting more pressure. The user may also tap in a more staccato-like fashion as compared to a calm person.

In embodiments, analysis module 108 associates the gesture with one or more predefined emotional states (angry, frustrated, etc.) and outputs the result as emotion data 110, for example, in form of a predefined mood level to response generator 112.

In embodiments, response generator 112 generates one or more output signals 114 based on the emotion data 110 or the determined emotional state. Output signals 114 may be provided to an application (e.g., on a mobile device), to actuators, and other external systems for further processing and generating or executing an appropriate response that may include one or more actions intended to affect a change in a user's mood (e.g., playing soothing music), reengage a user with a task, and/or adjust a difficulty level of a task. Other possible responses include generating a notification, e.g., via email, display of a dialog box, etc.

In embodiments, analysis module 108 comprises software that is placed between an application and an operating system of the device on which the user performs actions. The software may be designed to capture user-device interactions and pass gesture information, such as tapping data or a swipe pattern representative of the user's emotional state, to a different software application used by the device.

In embodiments, analysis module 108 automatically or based on user instructions initiates a machine learning process to create or update a user model in order to increase accuracy of subsequent analysis. In embodiments, the learning process comprises a training session that prompts the user to interact with the device in different user environments, such that sensor 104 can collect gesture information in different contexts. The gathered information is used to develop a model of patterns (e.g., tapping or swiping patterns) based on features, such as a typical amount of pressure a user exerts on a touch screen when tapping or swiping across the screen, a direction, a duration of the action, and the like.

One of skill in the art will appreciate that system 100 comprises internal and/or external storage devices, e.g., to store calibration data. It is understood that data analysis may be performed during regular operation and offline. In embodiments, phases of a training session or data analysis (e.g., learning of a user's general usage pattern) are performed as a background operation.

Figure 2:
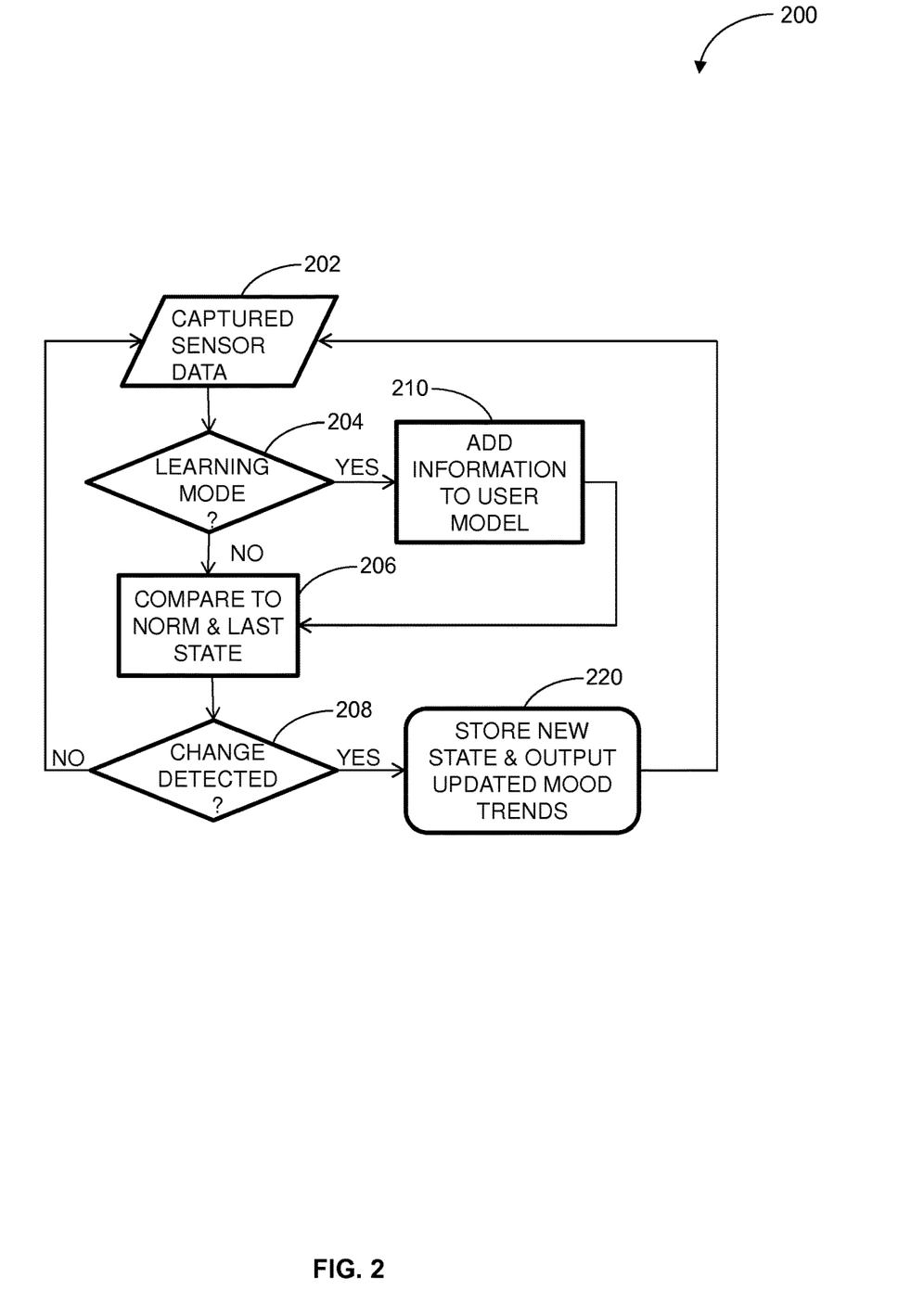
FIG. 2 is as flowchart of an illustrative process for determining the emotional state of a user, according to various embodiments of the invention.

FIG. 2 is as flowchart of an illustrative process for determining the emotional state of a user, according to various embodiments of the invention. In embodiments, the process 200 for determining the emotional state of a user begins at step 202, by monitoring an interaction between a user and a computing device to detect one or more gestures. Examples of possible gestures are provided with respect to FIG. 1 above.

In embodiments, at step 204, it is determined whether the system is in learning mode. If so, a training procedure is initiated and information gained may be used to create or update a user model. The decision whether to enter learning mode may be automatically controlled or manually set and reset. In embodiments, if it is decided to enter the learning mode, one or more reference gestures are captured, either in a training session, or by background processing during normal operation, or both. When in learning mode, information from the captured sensor data as well as contextual data may be continuously added to update the user model in step 210.

Upon updating the user model, processing may proceed as usual, at step 206, at which sensor data is compared to existing sensor data, e.g., statistically normalized data. Based on the results of the comparison, at step 208, it is determined whether the data indicate a change, for example, a statistically significant deviation that is sufficiently large to indicate an emotional state or change in the emotional state of a user. If the result of this determination is in the affirmative, then, at step 220, data associated with the detected emotional state of the user is output to execute some action or response prior to process 200 resuming with receiving sensor data, at step 202.

If, however, at step 208 it is determined that the results do not indicate an emotional state or a change in the emotional state of a user, process 200 may directly proceed to step 202.

Figure 3:
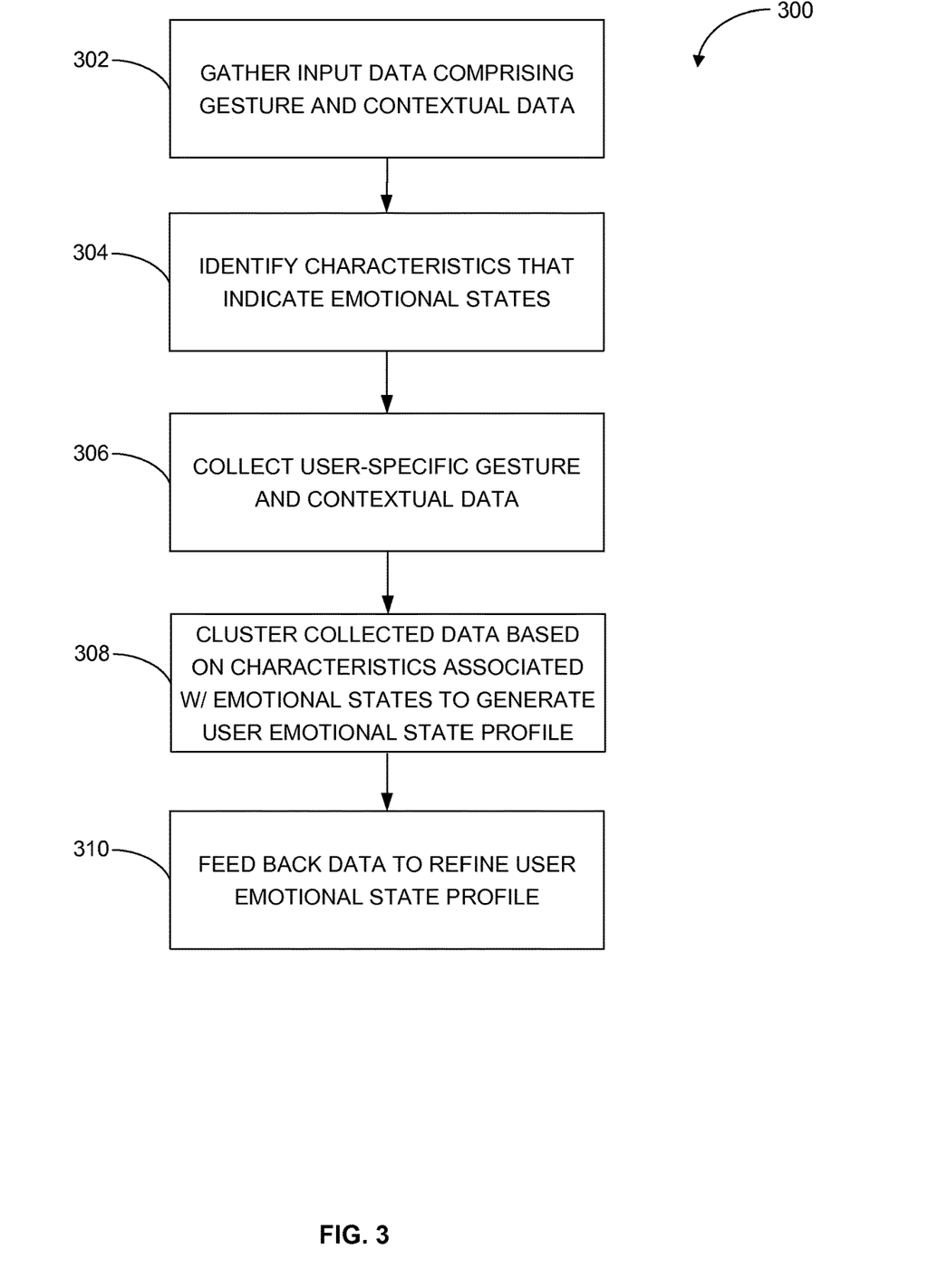
FIG. 3 is as flowchart of an illustrative process for generating and refining user profiles according to various embodiments of the invention.

FIG. 3 is as flowchart of an illustrative process for generating and refining a user profile according to various embodiments of the invention. Process 300 begins at step 302 when input data comprising gesture and/or contextual data, such as location data, environmental data, the presence of others, and the like, is gathered for one or more users in preparation for a training session.

In embodiments, a training session comprises the learning of use patterns that are characteristic for certain emotional states, such as frustration or anger, which are triggered under certain conditions. Emotional states may be triggered by provoking a predetermined user response during a specific training phase. As part of training, for example for purposes of calibration, a user may be prompted to think of or engage in activities that cause the user to experience a particular emotional state. In embodiments, the training session purposefully interjects non-responsive or repeatedly delayed or incorrect responses to user input by the device, application, or computing system, to observe user responses and interactions with the device that enable the detection of gestures that allow for an inference of an associated emotional state. A training or calibration phase may include the application of a test procedure that evaluates cognitive abilities or performance, and the generation of reference gesture data of one or more users.

In embodiments, machine learning is used to build a model of the behavior of users that may be verified by experimental data. For example, a large number of users may undergo a process designed to elicit various types of emotions that are observed to determine a correlation between users' emotional states and usage of a computing device (e.g., being angry and pressing the device more abruptly). This information may be used in generating a general user model against which individual users' behavior may then be compared in order to confirm that a particular detected device-user interaction, in fact, corresponds to an emotion displayed by that individual.

Training may be designed to allow a model to differentiate between a particular interaction performed under different conditions, e.g., different locations.

In embodiments, first, a mood detection module operates in a data collection only mode to capture an initial set of gesture data from one or more users. After a certain amount of data has been collected, at step 304, the mood detection module identifies characteristics that are representative of a user's different emotional states. In embodiments, categories of user activity are evaluated based on different environments in which the activity takes place so as to increase the accuracy of gesture and emotional state recognition. In embodiments, contextual data is used to set varying thresholds to different parameters that are considered in determining a particular user mood. As a result, the particular emotional state (e.g., happy) detected under one set of circumstances may be different from the emotional state detected under another set of circumstances.

For example, for a user in a work environment, the mood detection module may evaluate a gesture differently than the same gesture detected within the user's home. As another example, in scenarios where a user performs gestures while physically moving or being moved together with a device (e.g., inside a vehicle), the environment may be detected and recognized as providing less reliable data, such that data collected under these circumstances has to undergo additional filtering to suppress noise in the collected data. Alternatively, the less reliable data may be discarded altogether. In short, the evaluation of user activities may be augmented by environmental cues that aid in improving the user model and, ultimately, result in more accurate mood detection.

In embodiments, emotional states may serve as reference emotional states for a user reference model. Generally, reference emotional states may be generated based on collected single and/or multi-user gesture data. One skilled in the art will appreciate that a single user reference model or profile may be used as initial starting point to train numerous user models or profiles. In embodiments, a factor or parameter derived from contextual data serves as a weighing factor for adjusting an emotional state parameter or a threshold value in the user reference model. Reference user models account for activities in different categories (e.g. pressure, speed, etc.) that may be used to determine an emotional state (e.g., anger).

In embodiments, the training phase comprises data collected from two or more individual users. Multi-user data can be analyzed to extract common and different features across users. This information serves to create one or more reference user models against which an individual user's behavior may be compared to detect any deviations and determine for the particular user an emotional state.

At step 306, input data comprising gesture and contextual data for a particular user is received, e.g., from a sensor or memory device. It will be appreciated that contextual data is not limited to locations and environmental variables that can be detected, such as room temperature, illumination, etc., but may also include additional factors that may be used to provide context, such as the presence or mood of other persons, weather, detection of a facial expression, etc., that may be included in the learning process to normalize parameters associated with the identified characteristics.

At step 308, for one or more contexts, a mood detection module clusters the user-specific input data based on characteristics that are associated with a particular user emotional states to generate one or more context-dependent user emotional state profiles. The information provided by contextual data allows drawing a context-based distinction between user acting in one environment versus the same user acting in a different environment so as to permit proper recognition of the same mood despite changing ambience.

In embodiments, each profile may consider, weigh, and correlate different parameters differently to establish a unique user profile that aids in evaluating and interpreting context-based mood parameters. As an example, the time of day may play a role in determining mood at a user's work place or during travel, but the time of day would not have to be taken into account for determining a certain mood at the user's home, unless it contributes to altering the probability of the presence of the to-be-determined emotional state of the user.

It is noted that the initial data collection may result, for example, in the creation of only two clusters (e.g., happy and angry) instead of three clusters (e.g., happy, angry, and sad), due to the user not having been sad when using the device during the data collection period of the initial training phase. Once generated, clusters may be used as inputs for the user model while additional inputs (e.g., swipes and taps) that may aid in the determination of the user's mood are being gathered.

Finally, at step 310, clusters and, thus, user emotional state profiles are refined as more data is collected. For example, while, at first, a hard tap may be categorized as indicating anger, over time, a mood detection program may learn that hard taps merely indicate impatience, whereas relatively harder taps, in fact, indicate anger. In this manner, the user model is trained to recognize that relatively hard taps are required to indicate anger. In embodiments, machine learning is used to continuously update and improve user emotional state profiles.

It is noted that a user emotional state profile may be updated based on a profile that is assigned to another user. It is understood that user profiles may or may not be related to each other and need not necessarily involve common emotional states or parameters.

Figure 4:
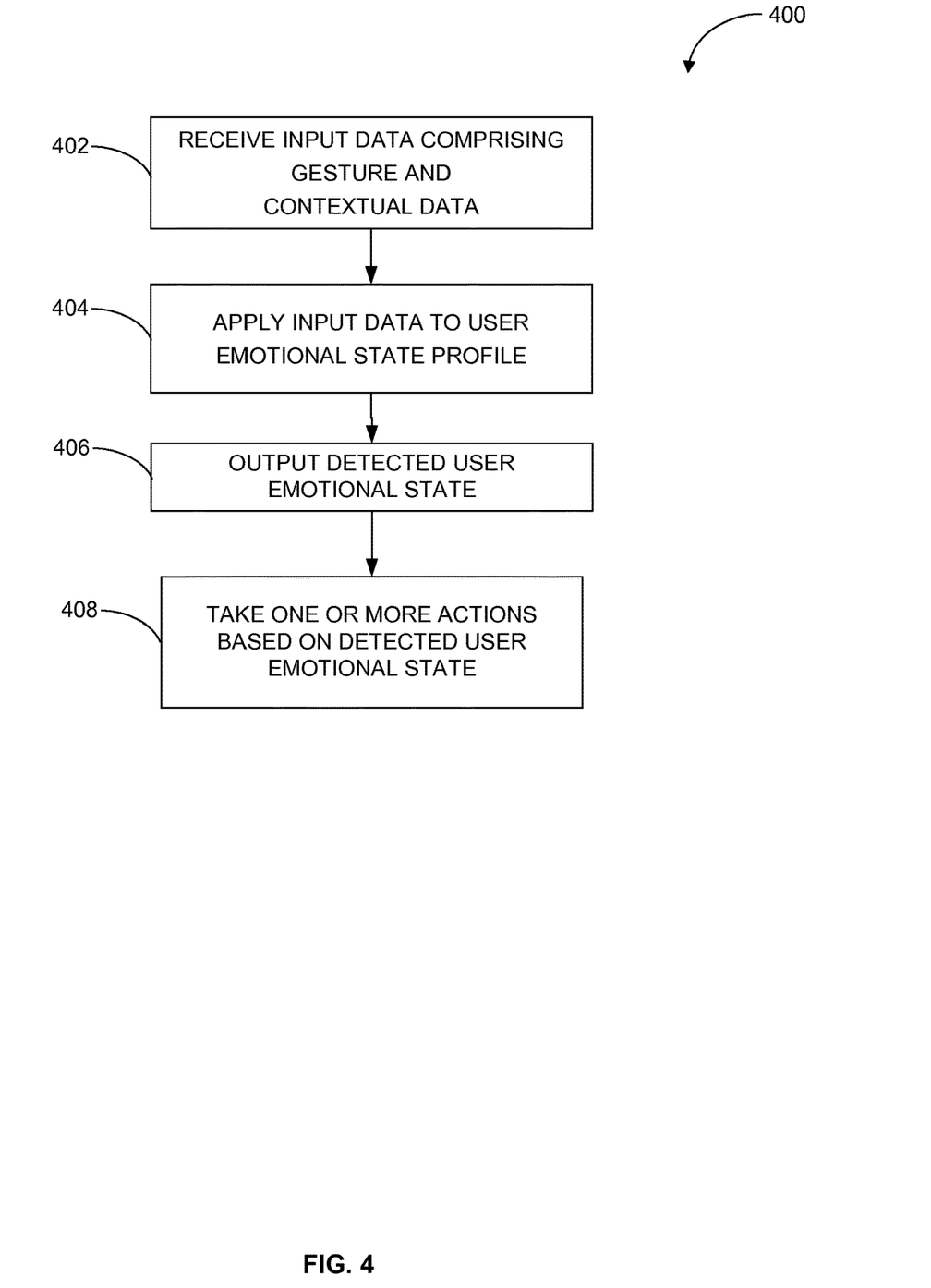
FIG. 4 illustrates a process for generating a response based on detecting an emotional state of a user, according to various embodiments of the invention.

FIG. 4 illustrates a process for generating a response based on detecting an emotional state of a user, according to various embodiments of the invention. Process 400 for generating a response begins at step 402 when input data comprising gesture data and/or contextual data is received, for example, from a sensor or memory device.

At step 404, the input data is applied to a trained user emotional state profile to generate, select, or modify one or more emotional state parameters for a user from which an emotional state of the individual user can be determined based on, for example, a correlation between emotional state parameters and the contextual data.

At step 406, a detected emotional state of the user is output.

Finally, at step 408, based on the detected emotional state, one or more actions previously described are taken.

Figure 5:
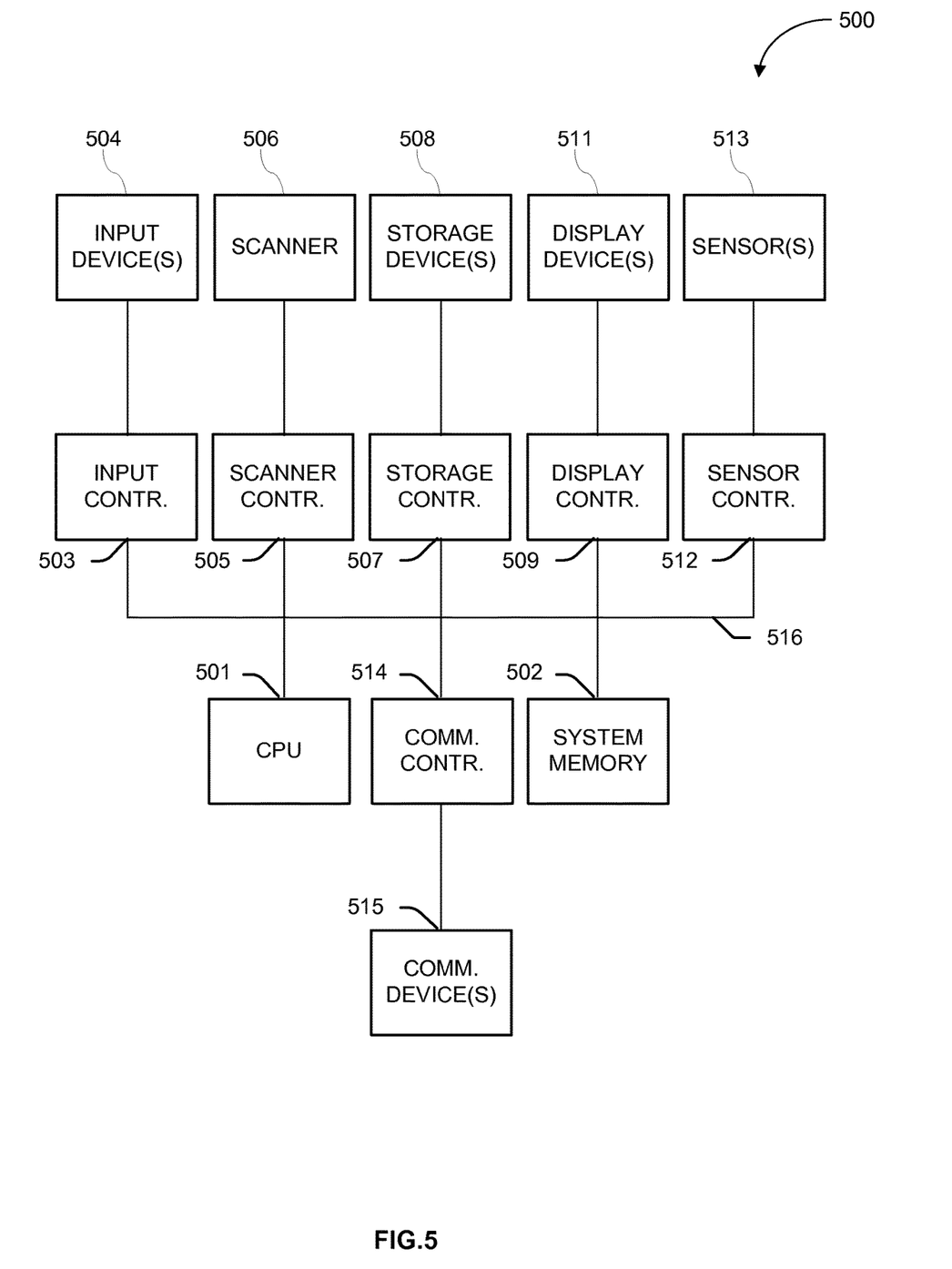
FIG. 5 depicts a simplified block diagram of an information handling system comprising a system for determining the emotional state of a user, according to various embodiments of the present invention.

FIG. 5 depicts a simplified block diagram of an information handling system comprising a system for determining the emotional state of a user, according to various embodiments of the present invention. It will be understood that the functionalities shown for system 500 may operate to support various embodiments of an information handling system—although it shall be understood that an information handling system may be differently configured and include different components. As illustrated in FIG. 5, system 500 includes a central processing unit (CPU) 501 that provides computing resources and controls the computer. CPU 501 may be implemented with a microprocessor or the like, and may also include a graphics processor and/or a floating point coprocessor for mathematical computations. System 500 may also include a system memory 502, which may be in the form of random-access memory (RAM) and read-only memory (ROM).

A number of controllers and peripheral devices may also be provided, as shown in FIG. 5. An input controller 503 represents an interface to various input device(s) 504, such as a keyboard, touch display, mouse, or stylus. There may also be a scanner controller 505, which communicates with a scanner 506. System 500 may also include a storage controller 507 for interfacing with one or more storage devices 508 each of which includes a storage medium such as magnetic tape or disk, or an optical medium that might be used to record programs of instructions for operating systems, utilities and applications which may include embodiments of programs that implement various aspects of the present invention. Storage device(s) 508 may also be used to store processed data or data to be processed in accordance with the invention. System 500 may also include a display controller 509 for providing an interface to a display device 511, which may be a cathode ray tube (CRT), a thin film transistor (TFT) display, or other type of display. The computing system 500 may also include a printer controller 512 for communicating with a printer 513. A communications controller 514 may interface with one or more communication devices 515, which enables system 500 to connect to remote devices through any of a variety of networks including the Internet, an Ethernet cloud, an FCoE/DCB cloud, a local area network (LAN), a wide area network (WAN), a storage area network (SAN) or through any suitable electromagnetic carrier signals including infrared signals.

In the illustrated system, all major system components may connect to a bus 516, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A method for determining user emotional states, the method comprising:
    receiving, via one or more standard inputs of a device, an initial set of input data comprising a first set of contextual data and gesture data relating to a user-device interaction, the initial set of input data comprising generic data and being unlabeled;
    generating derived data from the generic data;
    based on at least one of the generic data or the derived data, identifying a first set of patterns;
    assigning to the first set of patterns a first set of characteristics indicative of a generic user emotional state;
    applying the first set of characteristics to a generic model to generate a generic emotional state profile;
    collecting user-specific input data comprising a second set of contextual data and gesture data regarding interactions between a user and a computing device;
    clustering the user-specific input data based on, at least, a second set of characteristics;
    applying the second set of characteristics to a user-specific model to generate a user-specific emotional state profile regarding the interactions, wherein generating the user-specific emotional state profile comprises comparing the user's behavior against the generic model;
    feeding back the clustered user-specific input data as inputs to the user-specific model to refine the user-specific emotional state profile by adjusting a threshold value in the user-specific model by assigning to a parameter of the user-specific emotional state profile a weighing factor that is based on a relationship between the gesture data and the second set of contextual data; and
    using the user-specific emotional state profile and the second set of contextual data to identify a same user emotional state in at least two different environments.

2. The method according to claim 1, further comprising correlating at least some of the gesture data and at least some of the contextual data with a user emotional state.

3. The method according to claim 1 further comprising inputting collected input data comprising contextual data and gesture data into the user emotional state profile to determine a user emotional state during a time period in which at least some of the collected input data was obtained.

4. The method according to claim 1, further comprising updating the user-specific emotional state profile based on a second user-specific profile that is assigned to another user.

5. The method according to claim 1, wherein the user-specific emotional state profile comprises a trained set of characteristics.

6. The method according to claim 1, wherein the gesture data comprises information about at least one of a swipe pattern, a pressure exerted by a finger, a finger size, a speed of the gesture, a start or stop location, and a change in intensity of the gesture, and wherein contextual data comprises information about at least one of an activity of a user, a location of a user, and other nearby users.

7. The method according to claim 1, further comprising triggering a reference emotional state in a training session.

8. The method according to claim 7, wherein triggering the reference emotional state comprises one of preventing the computing device from responding to a user input and causing a delay in responding to the user input.

9. The method according to claim 1, further comprising applying a testing procedure to evaluate one of a cognitive ability and a performance prior to permitting a user-device interaction.

10. A method for determining a user emotional state, the method comprising:
    receiving, via one or more standard inputs of a device, an initial set of input data comprising a first set of contextual data and gesture data relating to a user-device interaction, the initial set of input data comprising generic data and being unlabeled;
    based on at least the generic data, identifying a first set of patterns associated with a first set of characteristics that are indicative of a generic user emotional state;
    applying the first set of characteristics to a generic model to generate a generic emotional state profile;

collecting user-specific input data comprising a second set of contextual data and gesture data regarding interactions between a user and a computing device;

clustering the user-specific input data based on, at least, a second set of characteristics;

applying the second set of characteristics to a user-specific model to generate a user-specific emotional state profile, wherein generating the user-specific emotional state profile comprises comparing the user's behavior against the generic model;

feeding back the clustered user-specific input data as inputs to the user-specific model to refine the user-specific emotional state profile by adjusting a threshold value in the user-specific model;

using the user-specific emotional state profile and the second set of contextual data to identify a user emotional state;

outputting the user emotional state; and generating a response based on the user emotional state.

11. The method according to claim 10, wherein the response is designed to do at least one of affecting a change in the user's mood, reengaging the user with a task, and adjusting a difficulty level of the task.

12. The method according to claim 10, further comprising monitoring the user-device interaction by using sensors communicatively coupled to an analysis module.

13. The method according to claim 10, wherein the user-specific emotional state profile is generated in a training session by clustering the input data based on characteristics associated with emotional states.

14. The method according to claim 10, further comprising refining the user-specific emotional state profile based on feedback data.

15. A system for determining an emotional state of a user of a computing system, the system comprising:
one or more standard inputs of a device to collect an initial set of input data related to gesture data and a first set of contextual data, the gesture data relates to a user-device interaction between a user and a computing device, the initial set of input data comprising generic data and requiring no labeling;

an analysis module that performs steps comprising:
based on at least the generic data, identifying a first set of patterns associated with a first set of characteristics that are indicative of a generic user emotional state;

applying the first set of characteristics to a generic model to generate a generic emotional state profile;

collecting user-specific input data comprising a second set of contextual data and gesture data regarding interactions between a user and a computing device;

clustering the user-specific input data based on, at least, a second set of characteristics;

applying the second set of characteristics to a user-specific model to generate a user-specific emotional state profile, wherein generating the user-specific emotional state profile comprises comparing the user's behavior against the generic model;

feeding back the clustered user-specific input data as inputs to the user-specific model to refine the user-specific emotional state profile by adjusting a threshold value in the user-specific model; and using the user-specific emotional state profile and the second set of contextual data to identify user emotional state; and a response generator coupled to the analysis module to receive the user emotional state and generate a response based on the user emotional state.

16. The system according to claim 15, wherein the analysis module further comprises a processing module coupled to the one or more standard inputs of the device, the processing module associates the one or more gestures and the contextual data with the emotional state and generates an output signal representative of the user emotional state.

17. The system according to claim 16, wherein the processing module is configured to compare the one or more gestures to one or more reference gestures.

18. The system according to claim 16, wherein the processing module is configured to use a machine learning process.

19. The system according to claim 15, wherein the one or more standard inputs of the device are implemented in at least one of a pointing device, a keyboard, and a touchscreen and comprise an accelerometer that detects one of an orientation and a speed of a device housing at least part of the computing system.

20. The system according to claim 15, wherein the analysis module is configured to cluster, in a training phase, gesture data based on a characteristic pattern that is associated with an emotional state parameter.

* * * * *